Jan. 30, 1951 J. C. STEINBERG 2,539,556

VARIABLE DELAY SPEECH PRIVACY SYSTEM

Filed July 11, 1941 3 Sheets-Sheet 1

INVENTOR
J. C. STEINBERG
BY H. A. Burgess
ATTORNEY

Jan. 30, 1951 J. C. STEINBERG 2,539,556

VARIABLE DELAY SPEECH PRIVACY SYSTEM

Filed July 11, 1941 3 Sheets-Sheet 2

INVENTOR
J. C. STEINBERG
BY H. A. Burgess
ATTORNEY

Jan. 30, 1951 J. C. STEINBERG 2,539,556

VARIABLE DELAY SPEECH PRIVACY SYSTEM

Filed July 11, 1941 3 Sheets-Sheet 3

INVENTOR
J. C. STEINBERG
BY
H. A. Burgess
ATTORNEY

Patented Jan. 30, 1951 2,539,556

UNITED STATES PATENT OFFICE 2,539,556

VARIABLE DELAY SPEECH PRIVACY SYSTEM

John C. Steinberg, Short Hills, N. J., assignor to Bell Telephone Laboratories, Incorporated, New York, N. Y., a corporation of New York Application July 11, 1941, Serial No. 401,897

15 Claims. (Cl. 179—1.5)

The present invention relates to transmission of intelligence with privacy.

In the embodiment to be particularly described herein, speech or other intelligence-bearing waves are recorded and are transmitted from the record out of their normal order, such normal order being restored at the receiving point in similar manner.

The invention has for its general object a system of this character that may be compactly built, may be operated by relatively unskilled personnel and that will give reliable service under adverse conditions.

A feature of the invention is its adaptation to use in the form of portable sets such as are suitable to be carried on airplanes, for example.

A further feature of the invention comprises means under control of the user for quickly changing the code.

In the specific embodiment of this invention to be disclosed, the record is in the form of a magnetic tape carried on the rim of a wheel or disc which is driven at constant speed by a motor. A recording magnet and a number of reproducing magnets are located at equal angular distances around the tape disc, and switching means are used to connect various of the reproducing magnets selectively into the reproducing circuit.

A further feature of the invention relates to the synchronizing of the local and distant tape driving mechanisms.

Still other features and the various objects of the invention will appear more fully from the following detailed description of an illustrative embodiment of a complete two-way system as shown on the attached drawings.

Figures 3, 6:
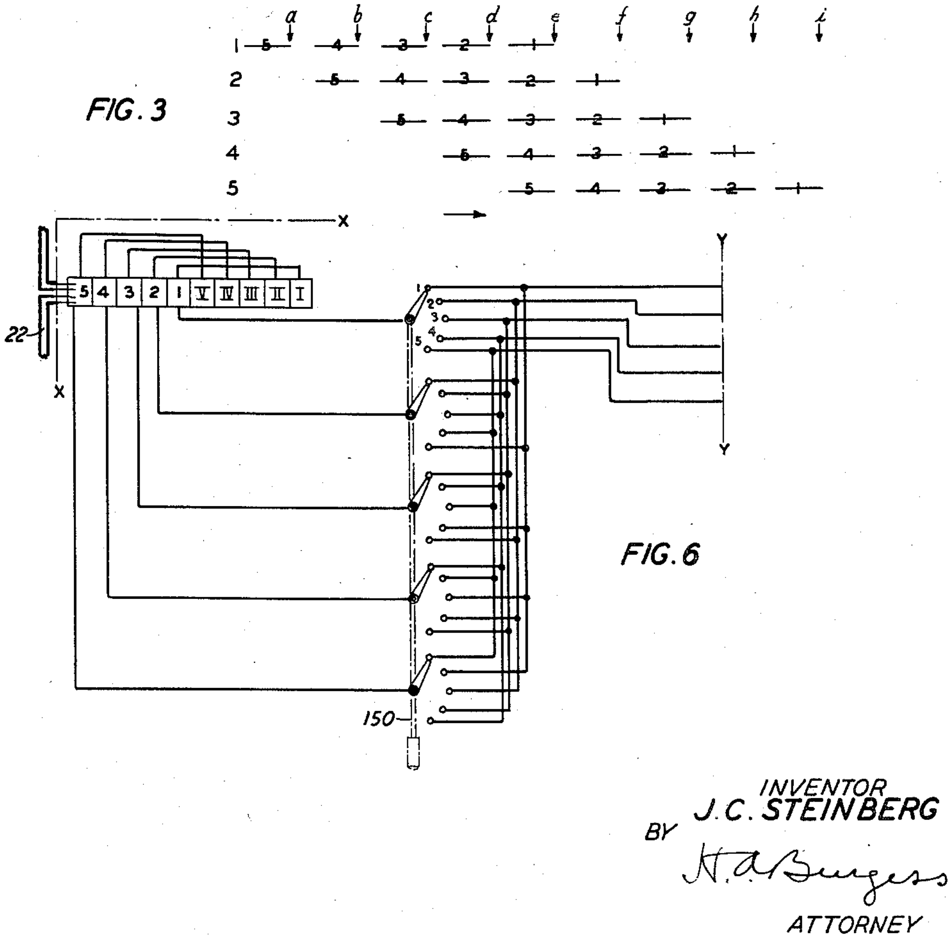
Fig. 3 is a diagram of sequence of operation to be referred to in the description.
Figure 4:
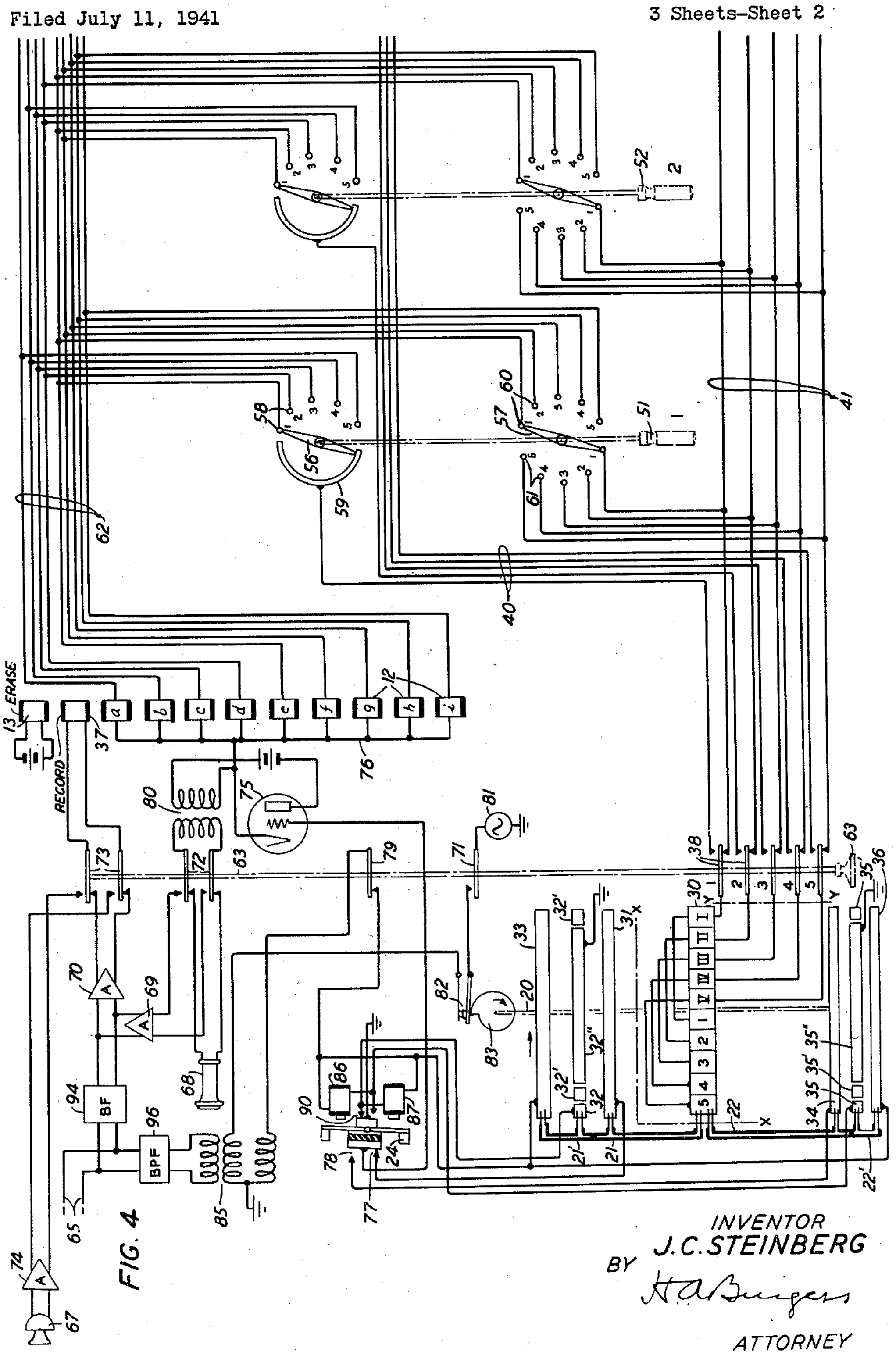
Figure 5:
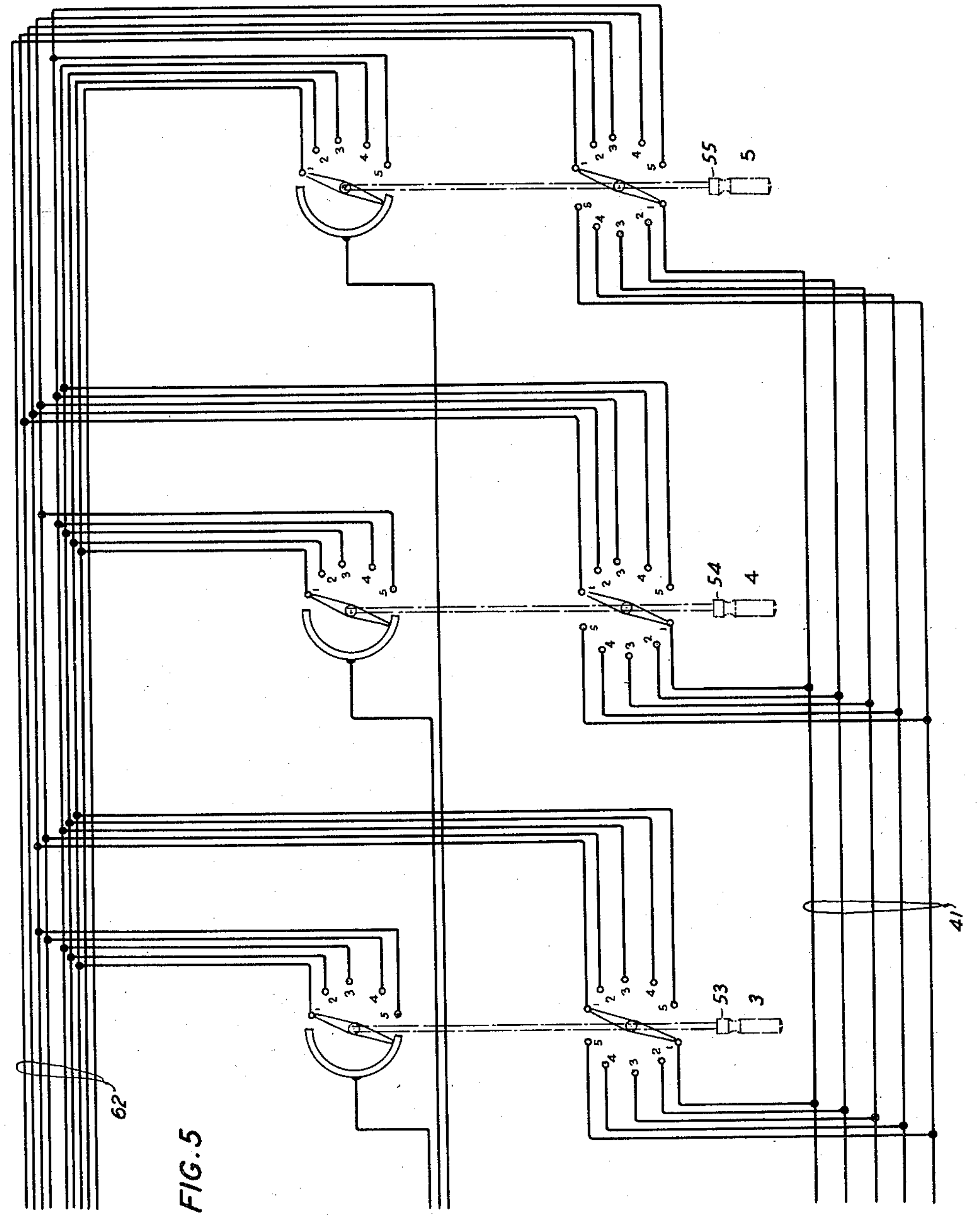

Figs. 4 and 5 when placed side by side with Fig. 4 at the left together show the circuit diagram of a complete two-way privacy system in accordance with the invention; and Fig. 6 shows how an additional code variation can be introduced into the system of Fig. 4 by insertion of this figure between lines X—X and Y—Y of Fig. 4.

Figure 1:
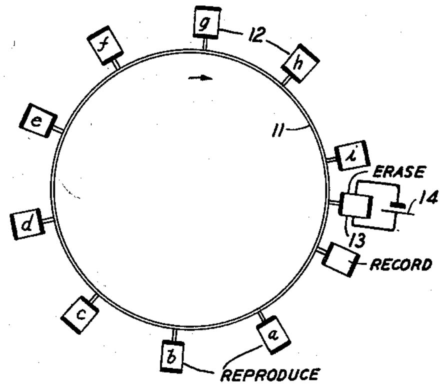
Fig. 1 is a diagram showing the angular positioning of the magnets around the tape disc.

Referring first to Fig. 1, the magnetizable tape 11 is represented as being driven clockwise past ten electromagnets 12, spaced at equal angular distances, and a coil 13 serving as an eraser magnet with its winding supplied by steady current from battery 14. Nine of these electromagnets 12 which are lettered in sequence *a* to *i* along the direction of motion of the tape are reproducing magnets, the tenth one being the recording magnet, as labeled.

Figure 2:
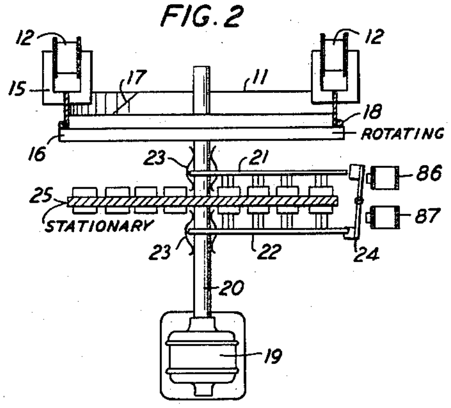
Fig. 2 is a diagram partly in section showing one manner of driving the tape disc and commutator brushes.

The actual construction is better shown in Fig. 2 where the coils 12 are shown as having closed magnetic circuits due to the yoke-shaped cores 15 which are astride the tape 11 and form a rubbing contact therewith to reduce the air-gap as much as possible. The tape 11 is wrapped once around the rim of disc 16 and has a bias butt joint at 17. The tape may be secured to the disc 16 in any suitable manner such as by binding wire 18. Only two of the electromagnets are illustrated in Fig. 2 but it is understood that the number and spacing of these coils are as in Fig. 1.

The tape disc is driven at constant speed by electric motor 19 through a drive shaft 20. This shaft also has frictional engagement with a pair of brush arms 21 and 22 as indicated on the drawing by springs 23 which grip the shaft. This showing is diagrammatic only and any known and suitable frictional drive may be used in actual construction. These brush arms rotate with the shaft when released by the stop lever 24 and are carried, one at a time depending on the position of stop lever 24, over fixed commutator segments on stationary insulated plate 25. In this construction there are two sets of commutator segments, one on each face of plate 25, and they are electrically joined to form in effect one commutator having upper and lower faces. By suitable interconnection between these commutator segments and the electromagnets 12, the connections between the electromagnets and the reproducer circuit are switched about so as to alter the time sequence of reproduction as will be more fully described later on.

In the construction shown in Fig. 2 there would be an outer ring of ten equal segments and a slip ring just inside it for switching between the electromagnets and reproducer circuit. The other contacts are for synchronizing. The connecting leads may be brought out around the periphery of plate 25. The significance of the number, 10, of segments and the number, 9, of reproducer magnets is that a five-unit code is assumed. The invention is not limited to this or any other number of code units, however, and other codes such as six-unit, seven-unit or others may be obtained with similar construction merely by extension of the arrangements disclosed herein.

In the diagram of Fig. 3, the arrows represent the positions of the magnets *a* to *i* of Fig. 1 laid out in a straight line representing elapsed time from left to right. The numbers at the left represent five different times separated by one commutating interval, that is, the time taken for the brush to travel across one segment. Likewise, this interval is the time of movement of a point on the tape from one magnet to the next. The dashes represent a recorded segment of speech, shown separated for clearness.

At the time 1 (top row), recording has progressed to the point where there is recorded speech on the tape up to magnet *e*, or five full units have been recorded. For simplicity of description, it is assumed (contrary to actual fact) that the recording has stopped, since the only interest at present is in considering the operations to be made on these five units of recorded speech. Time 2 shows that these recorded speech units have progressed one step farther, time 3 two steps farther, etc.

Study of this diagram will show that these five speech units can be picked up from the tape and sent in any sequence by use of the nine magnets *a* to *i*, if the sending begins at the instant represented by time 1. If the order in which the recording took place is represented by the numbers written on the dashes, the first recorded portion (1) is that just arriving at *e* in time 1 (top row). If the order in which these are to be sent is 12345, the diagram shows that only the one magnet *e* is to be used since, following down the successive rows 1 to 5, the segments in successive times reach *e* in the order 12345. The commutator segments for this case must, therefore, all be connected to magnet *e* so that the brush in passing over them connects the reproducer circuit or line to magnet *e* in each of the five successive time units.

If on the other hand the order of sending the speech fragments is to be 54321, Fig. 3 shows that the magnets to be used are *acegi* and the commutator segments are to be connected in that sequence to the reproducer magnets. Further consideration of Fig. 3 will show that the five speech units can be sent in all possible combinations and permutations by use of no more than nine reproducer magnets in, of course, five switching intervals, these intervals being marked off by a five-segment commutator. It may be noted that this is not inconsistent with the ten commutator segments mentioned in connection with Fig. 2, since diametrically opposite segments are connected directly together as will be described in connection with Fig. 4. If the brushes were driven through one complete revolution in the five time units instead of only half a revolution, a five-segment commutator could be used. The five switching times of Fig. 3 (vertical column of numbers) may be visualized also as five space elements representing the positions in space that five commutator segments would occupy, with the brush moving vertically over them.

The interconnection in different manner between the reproducer coils and commutator segments to change the order of sending the speech fragments is accomplished by the use of code switches and constitutes one feature of the present invention. These code switches will be disclosed more fully in connection with Figs. 4 and 5.

In Fig. 4 the commutator 30 is shown laid out flat or unrolled and comprises ten segments connected in pairs as previously pointed out. The commutator carries two brushes side by side representing electrically the same type of action as is illustrated in Fig. 2 and the brush arms are numbered 21 and 22 to correspond with the upper and lower brush arms of Fig. 2. These brushes are bridged from the commutator 30 across to a respective slip ring 31′ or 34. Upper and lower synchronizing rings are shown at 32, 33 and at 35, 36, respectively, and brushes 21′ and 22′ insulated from the signal brushes but carried by the same brush arms serve to bridge the gap between a respective ring 32 or 35 and its respective slip ring 33 or 36.

The reproducer magnets 12 are shown on Fig. 4 spread out in vertical line and they can be identified by the code letters *a*, *b* . . . *i* as in Fig. 1. The recording coil is shown at 37. The erasing coil is shown above the recording coil at 13.

The code switches are shown on Figs. 4 and 5 as the five-position manually operated switches 51, 52, 53, 54 and 55, provided at the lower ends of their shafts with handles or dials for rotating the switch arms to different positions. These switches are all alike. Switch 51, for example, carries two wipers 56 and 57 on the same shaft but insulated from each other. Wiper 56 may be stepped to engage at one end of five different contacts shown at 58, the opposite end engaging sector 59 in all positions. Wiper 57 at one end when stepped around engages contacts 60 and at the opposite end engages contacts 61. The handles may carry pointers moving past numbers 1, 2, 3, 4, 5 on the panel to show the operator the switch settings.

Bus conductors 40 are distributed to the sectors 59 of the code switches and lead to gang switch 38 by which they can be connected to the segments of commutator 30 when the press-to-talk key 63 is in upper or talking position. Bus conductors 41 are distributed to contacts 61 of the code switches and lead to the segments of commutator 30 through gang switch 38 when key 63 is in lower or receiving position. The contacts 58 and 60 of the code switches are distributed to bus conductors 62 leading to reproducer coils 12.

In the upper left portion of Fig. 4 there is shown a line 65 which may in practice be a two-way line leading to a distance or to a two-way radio station or other two-way transmission channel or system. As will presently be described in detail, speech originating in microphone 67 can with proper manipulation of the controls be sent with privacy out over line 65 to a distance, and, conversely, privacy speech received over line 65 from a distant cooperating terminal is converted into understandable speech and sent into receiver 68.

It is thought that from this point on the circuits can best be described by following through their operation. Let it be supposed that the system is to be used first to transmit with privacy from microphone 67 to outgoing line 65. Key 63 is pushed upward to the talk position thereby closing all upper contacts of gang switch 38 and switches 71, 72 and 73 and opening the lower contact of switch 79. The speech is (if desired) amplified at 74 and transmitted through upper closed contacts of switch 73 to recorder winding 37. This records the speech on the magnetic tape 11 shown in Figs. 1 and 2, assumed to be driven at constant speed by motor 19 (Fig. 2).

After five units of time (as measured by the angular movement of the tape to the fifth or *e* reproducer) there are five units of speech on the tape in normal sequence in readiness to be taken off in any chosen order and transmitted. It will be assumed at this point, with fuller description later, that the upper brush arm is being used and that it is at this instant entering upon segment number 1 of the commutator 30. It will also be assumed for illustration that the code to be used is 54132. Code switch 51 (1) is therefore set on contact 5, switch 52 (2) is set on contact 4, and the other three switches 53 (3), 54 (4), 55 (5) are set on contacts 1, 3, 2, respectively. With these settings it is seen that the reproducers 12 are connected to the commutator over bus conductors 62 and 40 in the order *acgfh*. In other words, in time unit 1 of the sending sequence, the upper brush is passing over segment 1 which is connected by the code switches to reproducer *a* and reference to Fig. 3 shows that this reproducer picks up from the tape the last recorded or fifth segment of the recorded speech. When passing over commutator segment 2 the brush is in connection with reproducer *c*, etc.

The upper brush is in a circuit extending from the cathode of tube 75, common conductor 76 for all nine reproducer coils 12, one of said reproducer windings, one of the bus conductors 62 and 40 determined by the setting of the code switches, corresponding contact of gang switch 38, corresponding commutator segment, brush 21, slip ring 31, lower contact 77 of armature 24 of stop magnet 86—87 to the grid of tube 75. The voltages developed in the reproducer coils in the assumed order *acgfh* are therefore impressed on the grid circuit of tube 75, are amplified and the output is transmitted through coil 80, upper or talking contacts of switch 72, amplifier 69 and to outgoing line or circuit 65.

Had the lower brush arm 22 been in use the circuit would have been the same except that it would have been traced through brush 22, slip ring 34 and upper contact 78 of armature of magnet 86—87, this contact being closed when stop member 24 is in position to release the lower brush arm.

It will be understood that while these five segments of speech are being sent out the next five are being recorded and that on the passage of the brush over the next five commutator segments these latter speech fragments will be sent out in the assumed code, assuming the code switches remain in the same setting. The transmission continues without interruption as long as the speech continues and the talk key 63 is pressed to its upper position.

A cam operated contact 82 is operated from shaft 20 by cam 83 and is arranged so that as the brush arm passes over the short synchronizing contact 32 a circuit is closed from grounded source 81 of synchronizing current, switch 71, contact 82 and transformer 85 for sending the synchronizing impulse to line through narrow band-pass filter 96. Thus, a synchronizing impulse is sent once per revolution of the brush when transmitting. Filter 94 is a band elimination filter which eliminates from the outgoing speech the narrow band of frequencies passed by the filter 96 so as to secure an appropriate margin between the speech and synchronizing pulses and prevent false operation of the synchronizing unit by received synchronizing pulses. It also keeps received speech from getting to the recording coil and earphones.

Let it now be assumed that privacy speech is being received over line 65 from a distant similar apparatus set to the same code 54132 and operating to transmit in the manner above described in detail in connection with the Fig. 4 and Fig. 5 circuits. Talk key 63 will now be in its lower position closing all switches 38, 72, 73 and 79 to their lower contacts and opening switch 71. The received speech message passes through filter 94, amplifier 70 and switch 73 to recorder magnet 37 and is recorded on the tape in the order (assumed) 54132 and is to be decoded into the order 12345. Reference to Fig. 3 will show that the reproducers *cbdgi* must be used in that order. It will be seen that the lower sets of wipers on the code switches 51 to 55 connect the reproducers to the commutators over bus conductors 62 and 41 in such manner that they will be brought into circuit in the order specified, *cbdgi*. For instance, when the brush is passing over commutator segment 1, it finds switch 53 with its wiper on contact 1 and this places reproducer *c* in circuit. In commutating time unit 2, switch 55 connects reproducer *b* in circuit, etc.

As the brush arm passes over the five segments, therefore, it connects the reproducers in proper decoding sequence in circuit with the grid of tube 75 via slip ring 31 and contact 77 (or ring 34 and contact 78 depending upon whether the upper or lower brush is being used). The amplified output passes through coil 80 and lower contacts of switch 72 to receiver 68. The synchronizing pulse is separated from the speech and is transmitted to coil 85 through narrow band-pass filter 96, for a purpose to be more fully described presently.

The synchronizing circuits will now be more fully described. The problem of synchronizing is somewhat different from that involved in telegraphy where there need be no loss of intelligence so long as the synchronism is sufficiently good to permit a portion of each impulse to be received and operate the receiving delay. Reference to Fig. 3 with the five units of recorded speech represented will show that if the receiving brush leads or lags slightly, it will tend to pick up some of the recorded speech in the wrong time order and this will appear as noise. Not only is intelligence lost but noise is introduced. Moreover, in start-stop telegraph systems, the distributors may be stopped briefly without necessarily losing intelligence since the signals are set up in definite time intervals which need not be continuous with one another, and which, moreover, usually involve definite marking and spacing times. This is not true in the case of speech, which occurs in sequences of different length, and is continuous within a sequence.

The synchronizing system to be described has some of the aspects of a start-stop system but has important differences, there being no actual stopping of the brushes unless there is lack of synchronism that must be compensated. The brushes in this case may execute a number of revolutions before any correction is required in which case there is no loss by unnecessary stoppages.

In accordance with this feature of the invention, one or the other of the two brushes is always being held stationary in correct position for starting when a synchronizing impulse is received. The other brush is rotating and is the brush that is in use. If the brush that is rotating is in correct synchronism it will be passing over the synchronizing segment at the instant when the synchronizing impulse is received, in which case it is not stopped but is allowed to continue. If the rotating brush is not in contact with the synchronizing segment when the synchronizing impulse arrives, the other brush is released and placed in circuit and the previously rotating brush is stopped when it arrives at the starting position.

Referring to Fig. 2, there is a common latch 24 which in the position shown stops the lower brush and allows the upper one to move. In its alternate position it stops the upper brush and allows the lower brush to move. It is actuated to one or the other position by magnets 86, 87 the circuits of which are illustrated in Fig. 4.

When latch 24 is in the position shown, it closes contact 77 and connects ring 31 traversed by upper brush 21 in circuit relation for use. The movable contacts carried on the latch would ordinarily be resiliently mounted in accordance with known practice in such cases, to permit a suitable movement before the circuit is broken. It will be noted that when the apparatus is operating as a transmitter the active brush continues to rotate, without stopping, during the entire transmitting period, since the energizing circuits for the latch magnets 86, 87 are broken at the lower contact of switch 79.

Continuing the description for the receiving condition, if upper brush 21′ passes over contact 32 at the instant when the synchronizing impulse is received, a direct shunt circuit is closed around magnet 87 which prevents movement of latch 24 and the brush proceeds on another revolution. This circuit is from contact 90 (which is one terminal of winding of 87), segment 32, brush 21′, slip ring 33 to opposite terminal of winding of 87. If this shunt circuit were not closed at this time, magnet 87 would be energized from transformer 85, contact 79, winding of 87, contact 90 and ground attached to latch 24. In this case, latch 24 would move to its alternate position releasing brush 22 for rotation and at the same time open contact 77 and close contact 78 to transfer the connection of the grid terminal of tube 75 from brush 21 to brush 22. Whether brush 21 were too fast or too slow it would be stopped upon reaching latch 24 and even if it continued for nearly a revolution before reaching 24 it would be without effect since it is disconnected from the rest of the circuit at lower contact of 77.

In addition to the short synchronizing segment 32 there are in the same ring the other short segments 32′, one on each side of segment 32 and the long segment 32″. Similarly, synchronizing segment 35 is flanked by segments 35′ and on the other side of these is the long segment 35″. Long segments 32″ and 35″ short-circuit the magnets 86, 87 except for the short interval in each rotation represented by the three short segments 32, 32′ or 35, 35′ in order to protect the magnets 86, 87 against false operation by static, noise, peaks of speech or other disturbing currents in the system. When these magnets are thus short-circuited the latch 24 remains in its last previous position. The latch cannot be shifted to its alternate position during any time that the brush 21′ is traversing segment 32 or 32″ or during any time that the brush 22′ is traversing segment 35 or 35″. The latch is shifted to its alternate position if the synchronizing impulse comes in when the upper brush is on either segment 32′ provided that is the brush that is in use, or when the lower brush is on either segment 35′ assuming the lower brush is the one that is in use. The total length of the three segments 32, 32′ or of the three segments 35, 35′ corresponds to the range of motor speed variations to which the motors are held. The length of segments 32 and 35 corresponds to the phase difference which may be tolerated. The cam springs 82 are arranged to close when the brush 21′ or 22′ is in the middle of segment 32 or 35, respectively.

The length of segment 32 or 35 should be equal to the average distance between the several brush arms of all of the different receivers after the brush arms are up to speed after having been released by the same start impulse. Variations in these distances arise from variations in delays in the band filters, variations in latch operation times and variations in frictional forces accelerating the brush arms to speed. The position of the short segment 32 or 35 with respect to the latch position should be such that the continuously moving sending brush, and the average receiver brush arm when starting from rest, reach a common position at the instant the receiver brush arm reaches constant speed. This can be determined by trial. In an actual case the brush that is at rest need not be on segment 32 or 35 when the arm is against the stop, for example.

In this manner the receivers are all synchronized to the transmitter. The fact that certain receivers may be out of synchronism does not penalize the receivers that are in synchronism. When a receiver takes over as transmitter, the rest of the stations, if receiving, synchronize themselves to the movement of such transmitter. It is desirable that the motors 19 (Fig. 2) driving all of the different machines shall be as nearly as possible constant speed motors and that all run at the same speed. Any motor capable of meeting the necessary speed requirements may be used. A motor especially suited to this use is disclosed in the copending applications of H. M. Stoller, Serial No. 400,247, filed June 28, 1941, now Patent No. 2,395,080, issued February 19, 1946, and E. R. Morton, Serial No. 400,299, filed June 28, 1941, now Patent No. 2,394,559.

With the arrangements thus far described the synchronizing impulse always occurs in fixed time relation with respect to the five signal intervals. For example, in the circuits thus far described the impulse occurs just before code interval number 1 in each two code combinations in Fig. 4. A circuit for shifting the time sequence of the synchronizing impulse with respect to the code combinations is shown in Fig. 6 which is assumed to be inserted in Fig. 4 to replace the elements between broken lines X—X and Y—Y. This modification involves another five-point gang switch 150 carrying five wipers connected to respective commutator segments. With the setting of switch 150 as shown it would produce no effect different from that already described since the wipers as set make contact with the same leads 40 or 41 as in the case previously described. However, when switch 150 is set to any other position from that shown, the synchronizing pulse is made to fall between different successive time intervals. Assuming that the pulse occurred between code intervals 5 and 1 with the switch 150 in position 1, the pulse will fall between code intervals 1 and 2 if the switch is in position 2; it will fall between code intervals 2 and 3 if the switch is in position 3, etc. In practice, switch 150 may be given a new setting with each new code combination or it may be changed more often or less often, as desired.

With the type of system disclosed herein, there is a slight delay in beginning to transmit occasioned by the necessity of recording a portion of the speech before it can be sent out in altered sequence. It should be noted that none of the speech will be lost by this process and the delay in transmission can be made a fraction of a second or small enough not to interfere seriously with two-way talking.

The invention is not to be construed as limited to the specific circuits or apparatus disclosed nor to the dimensions or values given, these being illustrative. The scope is defined in the claims, which follow.

What is claimed is:

1. In a two-way speech privacy system, single means for recording in normal sequence speech to be transmitted to and for recording scrambled speech received from a distance, upon a suitable recording medium, means to reproduce from said medium as scrambled speech, the speech recorded thereon in normal sequence, for transmission to a distance, and to reproduce from said medium in normal sequence the scrambled speech thereon received from a distance comprising a plurality of reproducers responsive to the record on said recording medium, and a plurality of multiposition code switches interconnected with said reproducers for determining by their settings the particular code and operating sequence of said reproducers that is being used, said switches also serving without change of setting to control the operating sequence of said reproducers for restoring received speech to decode the same.

2. In a speech privacy system comprising a transmitting station and a receiving station, means at the transmitting station for transmitting to said receiving station speech in short segments out of their normal order in definite sequences to render unauthorized reception difficult, and means at the receiving station for restoring the received speech segments to their normal order, each of said means including a commutator, means to send out periodic control pulses from the transmitting to the receiving station for synchronizing the operation of said commutators, and switching means for variably interposing said control pulses at different points in said sequences.

3. In a system for transmitting speech, a transmitting mechanically moving record and a receiving mechanically moving record, means to record speech on each of said records and to reproduce speech from each of said records, a driving motor individual to each of said records, transmitting and receiving commutators and brushes included in said means for altering the time order of elemental sounds as originally produced and as finally reproduced with respect to the order in which they are transmitted, and means to synchronize said brushes of the transmitting and the receiving commutators comprising means to stop one of said brushes periodically, and means to prevent stoppage of said one brush if the two brushes are in synchronism.

4. In speech transmission using a transmitting commutator to break up the speech waves before transmission and a receiving commutator to restore the transmitted waves to recognizable speech, means for synchronizing said commutators with minimum loss of speech waves comprising start-stop mechanism for that one of said commutators whose movement is to be synchronized to the movement of the other, and means for disabling the stop mechanism thereon and allowing continuous movement thereof whenever the two commutators are in synchronism upon reaching the stop-start phase.

5. In speech transmission using a transmitting commutator to break up the speech waves before transmission and a receiving commutator to restore the transmitted waves to recognizable speech, means to synchronize said commutators with minimum loss of speech waves comprising means to transmit an impulse periodically from the transmitting commutator, means to stop the receiving commutator if the latter is in advanced phase, means controlled by said impulse to restart the receiving commutator when the transmitting commutator has caught up with it, and means controlled by said receiving commutator for preventing stoppage of the receiving commutator whenever the receiving commutator is in phase with respect to the transmitting commutator upon arrival of such impulse.

6. In a system for synchronizing transmitting and receiving commutators each comprising a segmented ring and two independent brush arms movable over the same segmented ring, start-stop mechanism for the two brushes of the one of said commutators that is to be synchronized to the other, comprising a stop means for each of said two brush arms, arranged to hold one brush arm stationary in starting phase while the other is rotating, means to send a start impulse from the distant commutator, means controlled by said start impulse to immediately start the stationary brush, and means to prevent the starting of said stationary brush under control of said start impulse whenever the moving brush is in starting phase at the time of receipt of said starting impulse.

7. The combination defined in claim 6 comprising circuits adapted to be closed by passage of the brush arms over said segmented ring, and switching means operatively related to said stop means for disconnecting from said circuits the brush arm that is being held stationary in starting phase.

8. In a rotary distributor, two commutator faces comprising segments similarly disposed with corresponding segments on the two faces electrically connected to each other, two brush arms rotatable over the respective commutator faces, common stop mechanism for said brushes, circuits controlled by either one of said brushes and said commutator segments, and means including said stop mechanism for always holding one or the other brush in starting position ready to start in exact starting phase while the other brush is rotating.

9. The combination according to claim 8, including means to generate periodic synchronizing impulses, a synchronizing segment on each of said commutator faces, and a circuit controlled by the brush arm and said segment for operating said common stop mechanism to start the waiting brush arm.

10. In a synchronizing system, a transmitting rotary distributor running at nominal speed, a receiving distributor to be synchronized approximately to the speed of said transmitting distributor, start-stop mechanism for said receiving distributor, means to send periodic pulses from said transmitting distributor, means controlled by said pulses for operating said start-stop mechanism, and circuit means including contact segments on said receiving distributor to short circuit said operating means with respect to said pulses for rendering said start-stop mechanism inoperative to stop the receiving distributor whenever the receiving distributor is in sufficiently close synchronism at the instant of receipt of such pulse.

11. In a signaling system, a start-stop rotary distributor, a stop magnet for said distributor, a circuit for energizing said stop magnet, said circuit comprising a contact operated from said rotary distributor in a certain small part only of the rotation of the distributor, and other contact means operated from said rotary distributor during other portions of its rotation for disabling the energizing circuit of said magnet.

12. In a two-way telephone privacy system, means for breaking up speech waves into short fragments and transmitting the fragments in jumbled order, means to receive speech fragments in the same jumbled order and to rearrange them into their normal order for reception of the speech message, a set of code switches interconnected with said means for determining by their setting the type of jumbling to be used, said switches having one set of contacts determining the sending order and another set of contacts determining the character of rearrangement necessary to restore the fragments from said sending order to normal order, and common actuating means for both sets of contacts in the case of each of said switches.

13. In a privacy system, means at separated stations to establish a timing cycle, means to send a definite number of equal length message fragments in each timing cycle, arranged in order in a given sequence, means to send between said stations a timing pulse for governing said cycle establishing means, and circuit control means for sending said timing pulse before said message fragments in each cycle or between any two of the message fragments in a cycle, at will.

14. In a speech privacy system, means for recording speech in fragments, means for sending the recorded fragments in sequences in excess of two fragments in each sequence with the fragments in each sequence arranged in abnormal order, means for recording received speech fragments in secret sequence, a coding switch mechanism for determining the order of sending of the fragments in any given sequence, said coding switch mechanism having a transmitting control section and a receiving control section coordinated so as to determine a given secret sequence for sending and the converse of said given secret sequence for translating received fragments in said given secret sequence into normal speech.

15. In a speech privacy system, means to record speech on a suitable record medium, a reproducer circuit, a plurality of reproducers, a commutator for rendering said reproducers operative one at a time to reproduce said speech in short segments in said reproducer circuit in abnormal order in accordance with a predetermined code, code switches for variably connecting said commutator to said reproducers to vary the code, means for periodically transmitting timing pulses, and a code switch interconnected between said code switches and said commutator for changing the relative time of sending of said pulses with respect to the segments composing a said sequence.

JOHN C. STEINBERG.

REFERENCES CITED

The following references are of record in the file of this patent:

UNITED STATES PATENTS

| Number | Name | Date |
|---|---|---|
| 1,310,719 | Vernham | July 22, 1919 |
| 1,592,940 | Kendall | July 20, 1926 |
| 1,657,366 | Behn | Jan. 24, 1928 |
| 1,709,901 | Espenschied | Apr. 23, 1929 |
| 1,809,070 | Schapiro | June 9, 1931 |
| 1,829,783 | Chesnut | Nov. 3, 1931 |
| 1,868,967 | Cartier | July 26, 1932 |
| 2,006,961 | Moore | July 2, 1935 |
| 2,017,091 | Eklund | Oct. 15, 1935 |
| 2,101,224 | Osborne et al. | Dec. 7, 1937 |
| 2,171,542 | Cunningham | Sept. 5, 1939 |
| 2,217,864 | Griffith | Oct. 15, 1940 |
| 2,284,680 | Potts | June 2, 1942 |
| 2,301,455 | Roberts | Nov. 10, 1942 |
| 2.312 897 | Guanella | Mar. 2, 1943 |